United States Patent [19]

Orr

[11] Patent Number: 5,702,768
[45] Date of Patent: Dec. 30, 1997

[54] METHOD OF USE OF A COATING COMPOUND IN VESSELS, AND A COATING COMPOUND FOR VESSELS

[75] Inventor: Michael L. Orr, Pocatello, Id.

[73] Assignee: J. R. Simplot Co., Pocatello, Id.

[21] Appl. No.: 738,790

[22] Filed: Oct. 29, 1996

Related U.S. Application Data

[63] Continuation-in-part of Ser. No. 677,557, Jul. 8, 1996.
[51] Int. Cl.$^6$ ........................................ B05D 1/02
[52] U.S. Cl. ............... 427/421; 71/DIG. 4; 106/18.31; 106/18.32; 106/18.35; 210/755; 210/764; 422/7; 422/14; 422/15; 427/429
[58] Field of Search ............. 106/18.32, 18.35, 106/18.31; 210/755, 764; 422/7, 15, 16, 14; 71/DIG. 4; 427/421, 429

[56] References Cited

U.S. PATENT DOCUMENTS

| | | | |
|---|---|---|---|
| 3,197,301 | 7/1965 | Lutz | 71/DIG. 4 |
| 4,159,901 | 7/1979 | Beestman et al. | 422/15 X |
| 5,128,050 | 7/1992 | Gill | 210/755 |

OTHER PUBLICATIONS

Pope, Daniel H., et. al., "Some Experiences with Microbiologically Influenced Corrosion of Pipelines", MP, May 1995, pp. 23-28.

Nguyen, D.T., et. al., "Corrosion of Mild Steel Exposed to Inhibited Urea-Ammonium Nitrate Solution at Ambient Temperature Under Static Conditions", Article, Aug. 25-30, 1991, Natl. Meeting of the American Chemical Society, N.Y., 7 pages.

Lonza, Inc., "Barquat MB-50" and Barquat MB-80, Material Safety Data Sheet, 6 pages.

Lonza, Inc., "Bardac 208M", Material Safety Data Sheet, 7 pages.

*Primary Examiner*—Michael Lusignan
*Attorney, Agent, or Firm*—Wells, St. John, Roberts, Gregory & Matkin, P.S.

[57] ABSTRACT

The invention encompasses methods of preventing corrosion of vessel sidewalls. In one aspect, the invention includes an anti-corrosion treatment method of reducing internal corrosion of an ammonium phosphate holding vessel comprising providing at least one quaternary-amine-comprising compound within the vessel. In another aspect, the invention includes a treatment method of reducing corrosion of a vessel sidewall surface comprising utilization of a quaternary amine to form a protective layer on the vessel sidewall surface. In another aspect, the invention includes an anti-corrosion treatment method of reducing corrosion of a vessel comprising: a) flowing a liquid into the vessel; b) adding at least one compound to the liquid, the compound being added to a concentration which exceeds the solubility of the compound in the liquid; and c) coating the compound onto an internal surface of the vessel to form a protective layer over the internal surface. In yet another aspect, the invention includes an anti-corrosion mixture, comprising: a) an ammonium polyphosphate solution; and b) a quaternary-amine-comprising compound within the ammonium polyphosphate solution.

28 Claims, 3 Drawing Sheets

METHOD OF USE OF A COATING COMPOUND IN VESSELS, AND A COATING COMPOUND FOR VESSELS

RELATED PATENT DATA

This application is a continuation-in-part of U.S. patent application Ser. No. 08/677,557, filed Jul. 8, 1996, titled "Method Of Use Of A Coating Compound For Liquid-Fertilizer Holding Vessels, and Liquid Fertilizers", listing Michael L. Orr as the inventor.

TECHNICAL FIELD

This invention pertains to methods for reducing corrosion in vessels. The invention is thought to have particular relevance for reducing corrosion in metallic vessels. In one aspect, the invention pertains to methods for reducing corrosion in metallic vessels which hold nitrogen-comprising chemicals.

BACKGROUND OF THE INVENTION

Many chemicals are held and transported in metallic vessels. Among such chemicals are fertilizers and fire retardants.

Referring first to fertilizers, such chemicals comprise one of the largest market commodities of the chemical industry. The crucial elements that are generally added to soil in considerable quantities in the form of fertilizer are nitrogen, phosphorus, and potassium. Although numerous smaller quantities of elements might also be provided in fertilizers in trace quantities, fertilizers are generally based principally on nitrogen, phosphorus and potassium. Nitrogen is present in vast quantities in air, and commonly enters the fertilizer production process as ammonia, typically produced by fixation of atmospheric nitrogen. Phosphorus and potassium are extracted as mineral sources, and then converted into a form suitable for fertilizer use.

Fertilizer is typically manufactured into liquid or granular solid form, with the term "liquid" encompassing solutions, slurries and suspensions. Large scale agriculture typically utilizes liquid nitrogen based fertilizer, which is stored in large metallic holding vessels close to the site of application. Further, fertilizer manufacturers typically also store and ship liquid nitrogen based fertilizer in metallic vessels. The vessels are commonly formed from either carbon steel or stainless steel, as such steel holding vessels are capable of withstanding climatic temperature variation better than other materials, such as, for example, plastics. The metallic containers are utilized throughout the world, including the northern climates and substantially equatorial climates. Among the liquid nitrogen based fertilizers stored in such vessels are ammonium sulfate, urea ammonium nitrate, ammonium phosphate (typically polyphosphate), and calcium ammonium nitrate fertilizers.

A problem associated with storing liquid nitrogen based fertilizer in metallic vessels is corrosion on the internal surfaces of the holding vessels. Such corrosion can be caused by, for example, chemical attack by the fertilizer material. Alternatively, the corrosion can be caused by oxidation of the metal of the vessels occurring when the liquid nitrogen fertilizer is drawn down in a holding vessel and the internal surface of the vessel is thereby exposed to atmospheric oxygen. Other internal sidewall corrosion mechanisms can also occur.

In a typical yearly cycle in a northern climate, liquid nitrogen fertilizer will be moved through holding vessels from about March through October, the growing season in the Northern climates. During this period, the liquid fertilizer level within the holding vessels will fluctuate as the vessels are repeatedly filled and drained. Accordingly, the internal surface of the vessel is repeatedly exposed to chemical attack from liquid fertilizer, followed by oxidative attack as the liquid fertilizer level is drawn down.

During a period from about November to about March, the level of liquid fertilizer within the liquid-fertilizer holding vessels will remain static. The vessel will thus contain a liquid fertilizer to a given level and a head space above the liquid fertilizer. During the period from about November to about March, the vessel internal surface adjacent the liquid fertilizer will be continuously exposed to chemical attack from the liquid fertilizer, while the internal surface adjacent the head space will be continuously exposed to oxidative damage.

The corrosion of liquid-fertilizer holding vessels causes millions of dollars of annual expenses due primarily to the costs of repairing and replacing the damaged vessels. Also, the corrosion of liquid-fertilizer holding vessels can lead to formation of particulates, which eventually form an undesired sludge within a liquid fertilizer. Accordingly, it would be desirable to reduce the rate of corrosion of liquid-fertilizer holding vessels.

Presently, there has been some effort to reduce the corrosion caused by liquid fertilizer by adding organophosphates and/or fatty acid phosphoric materials to the liquid fertilizers. Mixed results have been obtained from the use of such additives, with corrosion of liquid-fertilizer holding vessels continuing to be a problem.

Another problem with liquid fertilizer can be the presence of organic particulates in the fertilizer. Such organic particulates can undesirably lower marketability of the liquid fertilizer. Accordingly, it would be desired to remove organic particulates from within a liquid fertilizer.

Solid, or granular fertilizer, is also frequently stored in metallic vessels, and can cause corrosion of such vessels. Accordingly, it is desirable to develop methods for protecting metallic holding vessels which contain solid fertilizer.

Referring next to fire retardants, these, like the above-discussed fertilizers, are commonly nitrogen-comprising mixtures. Specifically, fire retardants commonly comprise ammonium phosphate (typically ammonium polyphosphate) solutions or suspensions. A common composition of fire retardants is 10-34-0 (10:34:0 nitrogen:phosphorus:potassium). The nitrogen and phosphorus within the fire retardant suspension will commonly be in the form of monoammonium phosphate, diammonium phosphate, and ammonium sulfate. A typical mixture of a fire retardant suspension comprises the 10-34-0 in combination with clay.

Fire retardants are commonly stored in carbon steel containers or stainless steel containers. Such carbon steel containers and stainless steel containers are subject to corrosion, caused for example, by mechanisms similar to those discussed above regarding the corrosion caused by fertilizers. Additionally, fire retardant solutions and suspensions are frequently transported to fire in aluminum holding tanks attached, for example, to airplanes and helicopters. Such aluminum holding tanks may be particularly sensitive to corrosion. Accordingly, it is desirable to develop a method for protecting the surfaces of carbon steel containers, stainless steel containers, and aluminum containers from corrosion when such containers are utilized in holding and transporting fire retardants.

3

In addition to fertilizers and fire retardants, other chemicals are frequently stored and transported in vessels subject to corrosion. Accordingly, it would be desirable to develop a general method which could be utilized for treating vessels to inhibit corrosion of such vessels.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

In one aspect, an anti-corrosion treatment method of reducing internal corrosion of an ammonium phosphate holding vessel comprises providing at least one quaternary-amine-comprising compound within the vessel.

In another aspect, the invention includes a treatment method of reducing corrosion of a vessel sidewall surface comprising utilization of a quaternary-amine to form a protective layer on the vessel sidewall surface.

In yet another aspect, the invention includes an anti-corrosion mixture, comprising:

an ammonium polyphosphate solution; and a quaternary-amine-comprising compound within the ammonium polyphosphate solution.

More specifically, the present invention pertains to methods of using quaternary-amine-comprising compounds for reducing corrosion in vessels.

Figure 1:
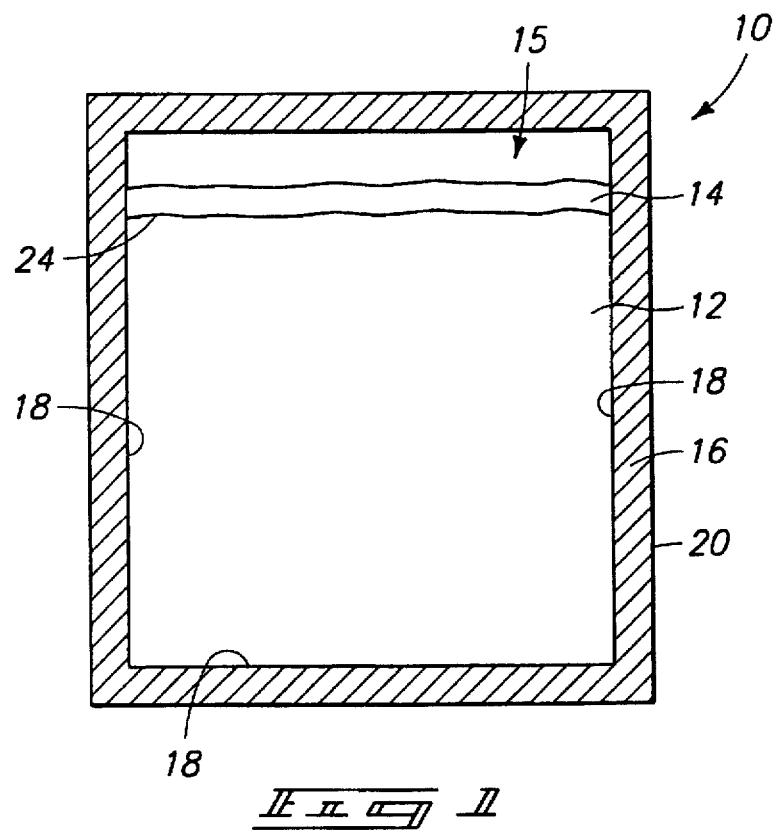
FIG. 1 is a cross-sectional diagrammatic side view of a vessel being treated according to a first embodiment of the present invention.
Figure 2:
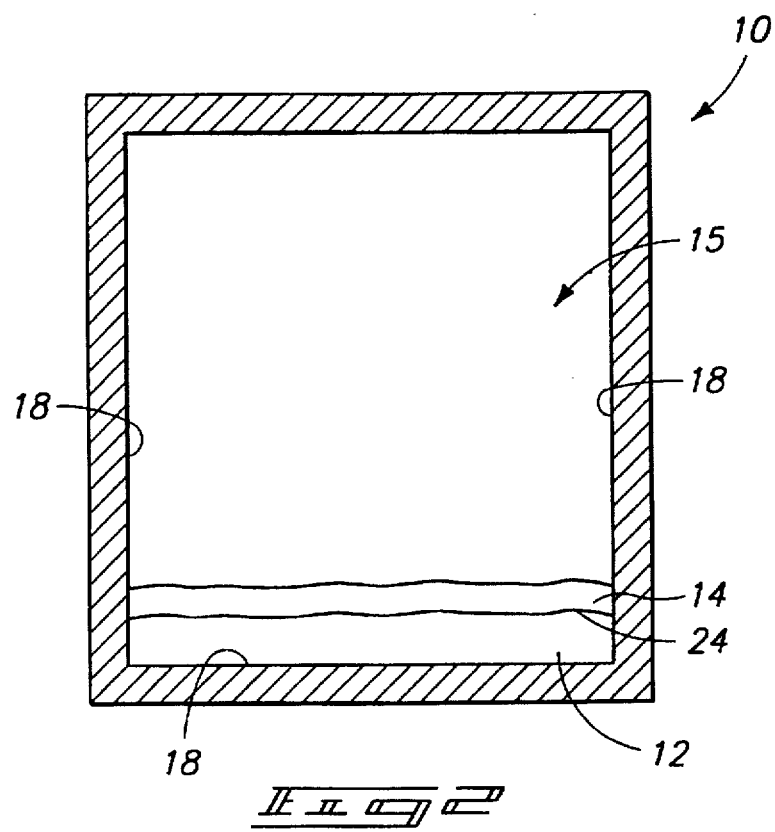
FIG. 2 shows the FIG. 1 vessel at a step subsequent to the step of FIG. 1.

One aspect of the invention is described with reference to FIGS. 1 and 2. Referring to FIG. 1, a vessel 10 is shown in cross-section. Vessel 10 comprises a vessel wall 16 having an internal surface 18 and an external surface 20. Internal surface 18 defines an internal sidewall of vessel 10.

Within vessel 10 is a layer of liquid 12 and a separate solvent layer 14 adjacent layer 12. Above layers 12 and 14 is a head space 15. Preferably, separate solvent layer 14 is an alcohol-comprising layer. In the shown preferred embodiment, alcohol-comprising layer 14 is less dense than liquid 12 and therefore floats above liquid 12. In one embodiment, layer 12 comprises an ammonium polyphosphate. Such layer 12 could be, for example, a fertilizer solution or suspension, or a fire retardant solution or suspension.

Within solvent layer 14 is at least one corrosion inhibiting compound which is more soluble in solvent layer 14 than in layer 12. Preferably, the compound is a quaternary-amine-comprising compound, and most preferably the quaternary-amine-comprising compound comprises at least one relatively long alkyl chain, such as an alkyl comprising from 10 to 18 carbon atoms, chemically attached to the quaternary amine. Among the preferred quaternary-amine-comprising compounds are those having a general chemical formula of alkyl dimethyl benzyl ammonium chloride, the alkyl most preferably comprising $C_8$–$C_{18}$. Suitable quaternary-amine-comprising compounds can be purchased, for example, under the trade name BARQUAT® from Lonza, Inc. of Fair Lawn, N.J. For instance, BARQUAT® MB-80 comprises alkyl dimethyl benzyl ammonium chloride, with the alkyl comprising 40% $C_{12}$, 50% $C_{14}$, and 10% $C_{16}$.

Preferably, the corrosion inhibiting compound is added to layer 12 to a concentration which exceeds the solubility of the compound in layer 12. Accordingly, some of the compound will not be dissolved in layer 12. The compound can be added directly to layer 12 without a separate solvent, and therefore without formation of the separate solvent layer 14. In such cases, at the preferable concentrations of compound exceeding its solubility in layer 12, some of the compound will generally either be suspended within and above the liquid 12, or be below the liquid 12.

Referring to FIG. 1, one method for adding a quaternary-amine-comprising compound to layer 12 is to add a solution of quaternary amine into a vessel 10, which is substantially filled with liquid of layer 12. Typically, the quaternary amine solution will comprise about 80% quaternary amine, and about 20% solvent, most preferably alcohol. An example suitable quaternary amine solution is the above-described BARQUAT® MB-80 which comprises about 80% quaternary amine compounds and about 20% solvent.

Preferably, if layer 12 comprises a liquid-fertilizer solution, the total concentration of quaternary-amine-comprising compounds within vessel 10 will be brought to from about 50 parts per million (ppm) to about 400 ppm, and most preferably to about 150 ppm. At such preferable concentrations of quaternary-amine-comprising compound, the concentration of quaternary amine in liquid fertilizer exiting a holding vessel 10 has been empirically determined to be between about 14 ppm and about 20 ppm. An example method of forming a preferable concentration of quaternary-amine-comprising compound within a vessel 10 is to add approximately six fluid ounces of an 80% quaternary amine solution to about one metric ton of liquid-fertilizer solution.

After quaternary amine solution 14 is provided within vessel 10, some of the quaternary amine disperses into layer 12, some remains within the solvent layer 14, and some coats the internal sidewall 18. The quaternary amine thus forms a layer 50 (shown in FIG. 6) over internal surface 18. Preferably, quaternary amine solution 14 will be added to the layer 12 with agitation to enhance dispersal of quaternary-amine-comprising compound throughout layer 12 and accordingly throughout the interior of vessel 10. However, regardless of whether the layer 12 is agitated during the initial addition of quaternary amine solution to layer 12, the quaternary-amine-comprising compound will generally eventually disperse throughout the layer 12 and throughout the interior of vessel 10.

The coating of interior surface 18 is enhanced by the draw-down of layer 12 from vessel 10 as layer 12 is removed from vessel 10. This is illustrated with reference to FIGS. 1 and 2. Referring first to FIG. 1, the layer 12 has an upper level 24 within holding vessel 10 when vessel 10 is substantially filled with liquid of layer 12. Referring next to FIG. 2, upper level 24 falls within vessel 10 as the layer 12 is drawn down in the vessel. The liquid of layer 12 is typically drawn down by flowing the liquid out of the vessel through an outlet (not shown).

As upper level 24 falls, layer 14 is pulled across internal surface 18 and a barrier layer 50 (shown in FIG. 6 and described subsequently) is deposited across substantially all of internal surface 18. Through repeated cycling of the steps of, 1) filling vessel 10 with liquid layer 12; and 2) removing liquid layer 12 from the vessel 10, layer 50 continues to accumulate quaternary-amine-comprising compound and thicken. Accordingly, layer 50 eventually becomes a substantially protective layer over the internal surface 18, and can reduce corrosion of internal sidewall 18. Layer 50 can reduce corrosion by a number of mechanisms. For instance, layer 50 can act as a barrier to impede the attack of chemicals from the layer 12 against surface 18. Also, layer 50 can inhibit atmospheric constituents, such as oxygen, from attacking portions of internal surface 18 in the head space 15.

An additional advantage of floating quaternary-amine-containing compound/solvent layer 14 over liquid 12 is that a number of particulates tend to be drawn from liquid 12 and into layer 14. For instance, particulates comprising predominantly organic matter appear to generally migrate from liquid 12 and into layer 14. Accordingly, layer 14 can tend to clarify a liquid 12, and thereby enhance the marketability of liquid 12. Also, by reducing corrosion, the corrosion inhibiting compound can reduce sludge formation, and thereby further aid in maintaining the clarity of liquid 12.

Figure 3:
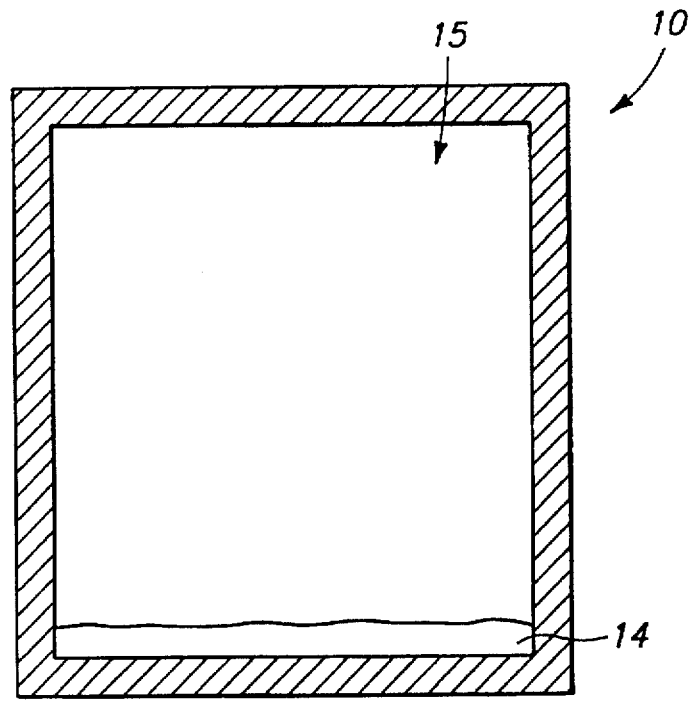
FIG. 3 is a cross-sectional diagrammatic side view of a vessel being treated according to a second embodiment of the method of the present invention.
Figure 4:
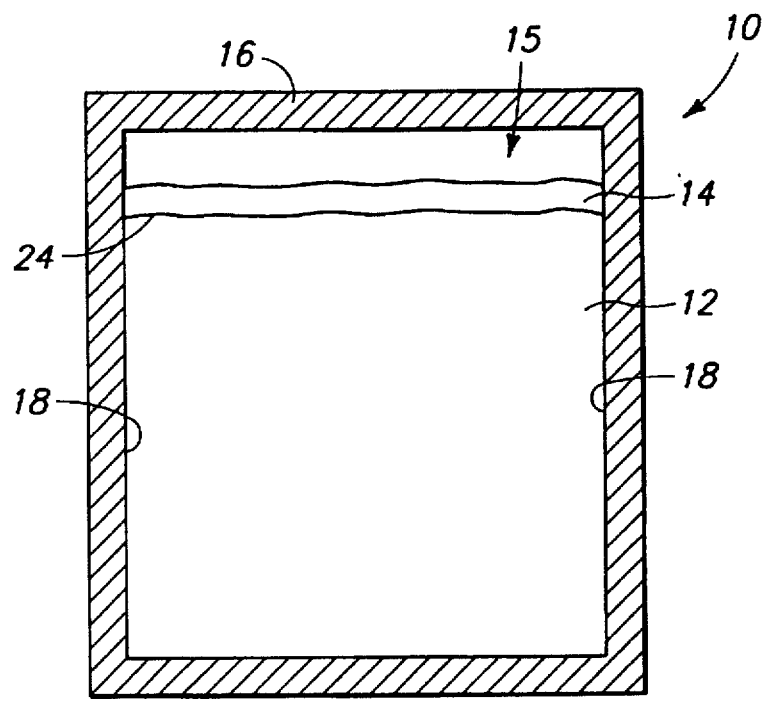
FIG. 4 is a view of the FIG. 3 vessel at a step subsequent to that of FIG. 3.

A second embodiment of the method of the present invention is described with reference to FIGS. 3 and 4. Referring first to FIG. 3, quaternary amine solution 14 is provided within vessel 10 prior to provision of liquid layer 12 (shown in FIG. 4) within the vessel. Subsequently, liquid layer 12 is flowed into the vessel, through an inlet (not shown). The in-flow of liquid layer 12 agitates quaternary amine solution 14 and thereby disperses the quaternary amine solution into liquid 12. Preferably, solution 14 will be the same preferable alcohol-containing solution described previously. Accordingly, the alcohol-containing solution 14 will eventually separate from the liquid layer 12 to form a layer over layer 12 as shown in FIG. 4. Occasionally, prior to the clean separation of layers 14 and 12, it has been found that a foam forms over the layer 12. However, this foam generally collapses to form separated layers 12 and 14.

As discussed previously regarding FIGS. 1 and 2, repeated cycling of liquid 12 into and out of vessel 10 will raise and lower an upper surface 24 of the layers 12, resulting in the formation of a protective layer 50 (shown in FIG. 6, and to be discussed subsequently) over internal surface 18 of vessel 10.

It is noted that the thickness of layer 14 typically decreases over time, presumably due to volatilization of solvent from the layer 14. For instance, if layer 14 is initially about an inch thick, it will typically reduce to about ⅛ of an inch thick in about eight to nine months time.

Also, it is noted that a used layer 14 may eventually be removed from a vessel 10 and replaced with a fresh layer 14. For instance, if vessel 10 is a liquid fertilizer storage vessel, it will generally be emptied once a year, and cleaned. It is considered that solution 14 can be relatively conveniently replaced in such liquid fertilizer storage vessels during the once-a-year cleaning.

Additionally, it is noted that an ammonium phosphate/quaternary amine mixture may comprise a substantially uniform suspension. Such suspension may comprise anti-corrosion properties, particularly if the quaternary amine in the suspension falls out of the suspension and coats an internal surface of a container containing the suspension. A method for introducing quaternary amines into fire-retardant holding tanks is to fill the tanks with a fire retardant comprising such ammonium phosphate/quaternary amine suspension. The quaternary amine can then fall out of the suspension and coat an internal sidewall of the holding tank to inhibit corrosion of the tank. The method could inhibit corrosion of holding tanks comprising, for example, aluminum, carbon steel and stainless steel.

An alternate aspect of the invention is to add a quaternary-amine-comprising compound to a liquid in a mobile transporting vessel, such as a truck or rail car, and to then transport the mixture of quaternary-amine comprising compound and liquid to a stationary liquid-holding vessel. Additionally, the quaternary-amine-comprising compound can be added to a liquid, such as liquid fertilizer or liquid fire retardant, at a production facility of the liquid, and subsequently transported to stationary holding vessels.

In alternative embodiments of the invention, the quaternary-amine-comprising compound can be sprayed onto an internal surface 18 of a vessel 10, or brushed onto the surface. Such spraying or brushing may be a preferred method of application for protecting vessels utilized for storing substantially dry chemicals, such as substantially dry fertilizers.

Figure 5:
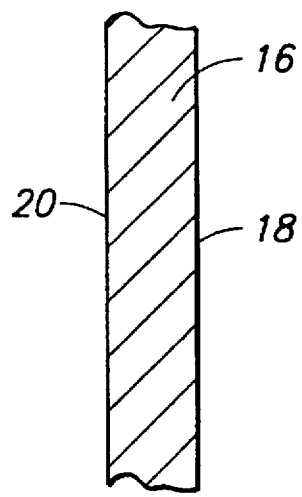
FIG. 5 is a fragmentary cross-sectional diagrammatic side view of a vessel prior to treatment by the method of the present invention.
Figure 6:
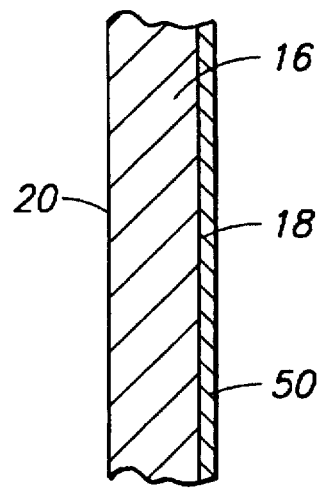
FIG. 6 is a view of the FIG. 5 vessel after treatment by the method of the present invention.

The formation of protective layer 50 is described with reference to FIGS. 5 and 6. Referring first to FIG. 5, a partial cross-section of vessel wall 16 is shown prior to contact of the internal surface 18 with a quaternary-amine-comprising compound. In FIG. 6, the vessel wall 16 is shown after contact of internal surface 18 with the quaternary-amine-comprising compound, illustrating the formation of a protective layer 50 over internal surface 18. Protective layer 50 may form a barrier to protect internal surface 18 from chemical attack by atmospheric oxygen, and from chemical attack by components of chemicals stored within vessel 10 (shown in FIGS. 1-4).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An anti-corrosion treatment method of reducing internal corrosion of an ammonium phosphate holding vessel comprising providing at least one quaternary-amine-comprising compound within the vessel, the quaternary-amine-comprising compound comprising alkyl dimethyl benzyl ammonium chloride, the alkyl comprising at least 12 carbon atoms.

2. The method of claim 1 wherein the vessel is a stationary vessel.

3. The method of claim 1 wherein the vessel is a mobile transporting vessel.

4. The method of claim 1 wherein the quaternary-amine-comprising compound comprises alkyl dimethyl benzyl ammonium chloride, the alkyl comprising from 12 to 16 carbon atoms.

5. The method of claim 1 wherein the holding vessel has an internal surface and wherein the reducing of corrosion comprises reducing oxidation of the vessel internal surface.

6. The method of claim 1 wherein the holding vessel has an internal sidewall, the method comprising coating the internal sidewall with the quaternary-amine-comprising compound.

7. The method of claim 6 wherein the quaternary-amine-comprising compound is sprayed onto the internal sidewall.

8. An anti-corrosion treatment method of reducing internal corrosion of a ammonium polyphosphate holding vessel comprising providing a quaternary-amine-comprising compound to a concentration of from about 50 ppm to about 400 ppm in an ammonium polyphosphate comprising liquid within the vessel.

9. A treatment method of reducing corrosion of a vessel sidewall surface comprising utilization of a quaternary amine to form a protective layer on the vessel sidewall surface.

10. The method of claim 9 wherein the quaternary amine compound is brushed on the vessel sidewall surface.

11. The method of claim 9 wherein the quaternary amine compound is sprayed on the vessel sidewall surface.

12. The method of claim 9 wherein the vessel sidewall surface comprises aluminum.

13. The method of claim 9 wherein the vessel sidewall surface comprises stainless steel.

14. An anti-corrosion treatment method of reducing corrosion of a vessel comprising:

flowing a liquid into the vessel;

adding at least one compound to the liquid, the compound being added to a concentration which exceeds the solubility of the compound in the liquid; and coating the compound onto an internal surface of the vessel to form a protective layer over the internal surface.

15. The method of claim 14 wherein the compound is provided in a solvent layer within the vessel, the solvent layer being a separate insoluble layer from the liquid.

16. The method of claim 14 wherein the compound is provided in a solvent layer within the vessel, the solvent layer being a separate insoluble layer from the liquid and being over the liquid.

17. The method of claim 14 wherein the compound is provided within the vessel prior to flowing the liquid into the vessel.

18. The method of claim 14 wherein the compound is provided within the vessel after flowing the liquid into the vessel.

19. An anti-corrosion treatment method of reducing corrosion of a ammonium polyphosphate holding vessel comprising:

providing a substantially insoluble liquid film of a quaternary-amine-comprising compound over a volume of ammonium polyphosphate within a steel vessel; and coating internal sidewalls of the steel vessel with the quaternary-amine-comprising compound as the volume of ammonium polyphosphate increases and decreases within the vessel.

20. The method of claim 19 wherein the quaternary-amine-comprising compound comprises alkyl dimethyl benzyl ammonium chloride, the alkyl comprising at least 12 carbon atoms.

21. The method of claim 19 wherein the quaternary-amine-comprising compound comprises alkyl dimethyl benzyl ammonium chloride, the alkyl comprising from 12 to 16 carbon atoms.

22. An anti-corrosion mixture, comprising:

an ammonium polyphosphate solution; and a quaternary-amine-comprising compound within the ammonium polyphosphate solution, the quaternary-amine-comprising compound comprising alkyl dimethyl benzyl ammonium chloride, the alkyl comprising at least 12 carbon atoms.

23. The anti-corrosion mixture of claim 22 wherein the ammonium polyphosphate solution is within a slurry.

24. The anti-corrosion mixture of claim 22 wherein the ammonium polyphosphate solution is a fertilizer.

25. The anti-corrosion mixture of claim 22 wherein the ammonium polyphosphate solution is a fire retardant.

26. The anti-corrosion mixture of claim 22 wherein the quaternary-amine-comprising compound comprises alkyl dimethyl benzyl ammonium chloride, the alkyl comprising from 12 to 16 carbon atoms.

27. The anti-corrosion mixture of claim 22 wherein the quaternary-amine-comprising compound is present within the ammonium polyphosphate solution in a concentration of from about 14 ppm to about 20 ppm.

28. The anti-corrosion mixture of claim 22 wherein the quaternary-amine-comprising compound is present within the ammonium polyphosphate solution in a concentration which exceeds solubility limit of the quaternary-amine-comprising compound in the ammonium polyphosphate solution.

* * * * *